(12) United States Patent
Johansson

(10) Patent No.: US 11,228,713 B2
(45) Date of Patent: Jan. 18, 2022

(54) ADJUSTMENT DEVICE, PHOTOGRAPHING ASSEMBLY, AND PHOTOGRAPHING DEVICE

(71) Applicant: VICTOR HASSELBLAD AB, Götenborg (SE)

(72) Inventor: Karl Tomas Johansson, Götenborg (SE)

(73) Assignee: VICTOR HASSELBLAD AB, Götenborg (SE)

( * ) Notice: Subject to any disclaimer, the term of this patent is extended or adjusted under 35 U.S.C. 154(b) by 0 days.

(21) Appl. No.: 16/928,827

(22) Filed: Jul. 14, 2020

(65) Prior Publication Data

US 2020/0344418 A1 Oct. 29, 2020

Related U.S. Application Data

(63) Continuation of application No. PCT/CN2018/072660, filed on Jan. 15, 2018.

(51) Int. Cl.
*H04N 5/232* (2006.01)
*H04N 5/225* (2006.01)

(52) U.S. Cl.
CPC ....... *H04N 5/23287* (2013.01); *H04N 5/2252* (2013.01)

(58) Field of Classification Search
CPC ............. H04N 5/23287; H04N 5/2252; H04N 5/2253; G03B 2205/0038; G03B 2205/0061; G03B 35/08; G03B 5/00
See application file for complete search history.

(56) References Cited

U.S. PATENT DOCUMENTS

2007/0257989 A1* 11/2007 Shirono ............... H04N 5/2253
348/208.99
2008/0079849 A1* 4/2008 Inaba .................. H04N 5/2253
348/374
(Continued)

FOREIGN PATENT DOCUMENTS

CN 101067709 A 11/2007
CN 102984439 A 3/2013
(Continued)

OTHER PUBLICATIONS

The World Intellectual Property Organization (WIPO) International Search Report for PCT/CN2018/072660 dated Sep. 29, 2018 7 pages.

*Primary Examiner* — Gevell V Selby
(74) *Attorney, Agent, or Firm* — Anova Law Group, PLLC

(57) ABSTRACT

An adjustment device, a photographing assembly and a photographing device are provided in the present disclosure. The photographing device includes an underframe, a cover plate, and a photographing assembly installed between the underframe and the cover plate. The photographing assembly includes a photosensitive element and an adjustment device configured to adjust a position of the photosensitive element. The adjustment device includes plates and displacement adjusters. A support plate includes a frame body, an adjustment part in the frame body, and an elastic part for connecting the frame body with the adjustment part. A spacing is between the adjustment part and the frame body, and the adjustment part is able to move relative to the frame body. A displacement adjuster is abutted against the adjustment part and configured to overcome an elastic force of the elastic part to adjust a relative position between the adjustment part and the frame body.

19 Claims, 7 Drawing Sheets

(56) References Cited

U.S. PATENT DOCUMENTS

| | | | |
|---|---|---|---|
| 2009/0219400 A1 | 9/2009 | Hasegawa et al. | |
| 2011/0299842 A1 | 12/2011 | Lee | |
| 2012/0147148 A1 | 6/2012 | Kusaka | |
| 2012/0287335 A1* | 11/2012 | Ji | H04N 5/2171 348/373 |
| 2015/0070115 A1* | 3/2015 | Okamura | H04N 5/2328 335/219 |

FOREIGN PATENT DOCUMENTS

| | | |
|---|---|---|
| CN | 103261963 A | 8/2013 |
| CN | 104765222 A | 7/2015 |
| CN | 104808416 A | 7/2015 |
| CN | 105022204 A | 11/2015 |
| CN | 106405991 A | 2/2017 |
| CN | 107257429 A | 10/2017 |
| JP | 2005331609 A | 12/2005 |
| JP | 2010266789 A | 11/2010 |

* cited by examiner

ADJUSTMENT DEVICE, PHOTOGRAPHING ASSEMBLY, AND PHOTOGRAPHING DEVICE

CROSS-REFERENCE TO RELATED APPLICATION

This application is a continuation of International Application No. PCT/CN2018/072660, filed Jan. 15, 2018, the entire content of which is incorporated herein by reference.

TECHNICAL FIELD

The present disclosure relates to the field of photographing technology and, more particularly, to an adjustment device, a photographing assembly, and a photographing device.

BACKGROUND

With wide applications of photographing devices in recent years, users have higher demands for obtaining high-quality images. However, the photographed images taken by existing photographing devices may not have desired sharpness, because the photographing devices may be shaking, e.g., due to external vibrations or shaky hands, during the photographing process.

SUMMARY

In accordance with the disclosure, a photographing device is provided in the present disclosure. The photographing device includes an underframe, a cover plate, and a photographing assembly installed between the underframe and the cover plate. The photographing assembly includes a photosensitive element and an adjustment device configured to adjust a position of the photosensitive element. The adjustment device includes a plurality of support plates, each including a frame body, an adjustment part in the frame body, and an elastic part for connecting the frame body with the adjustment part, where the adjustment part supports the photosensitive element, a spacing is between the adjustment part and the frame body, and the adjustment part is able to move relative to the frame body. The adjustment device further includes a plurality of displacement adjusters, where a displacement adjuster is abutted against the adjustment part and configured to overcome an elastic force of the elastic part, adjust a relative position between the adjustment part and the frame body, and adjust the position of the photosensitive element.

BRIEF DESCRIPTION OF THE DRAWINGS

In order to more clearly illustrate technical solutions in embodiments of the present disclosure, drawings required for describing the embodiments are briefly illustrated hereinafter. Obviously, the following drawings are merely examples for illustrative purposes according to various disclosed embodiments of the present disclosure and are not intended to limit the scope of the present disclosure. Those skilled in the art may obtain other drawings according to the drawings of the present disclosure without any creative efforts.

DETAILED DESCRIPTION OF THE EMBODIMENTS

Figure 1:
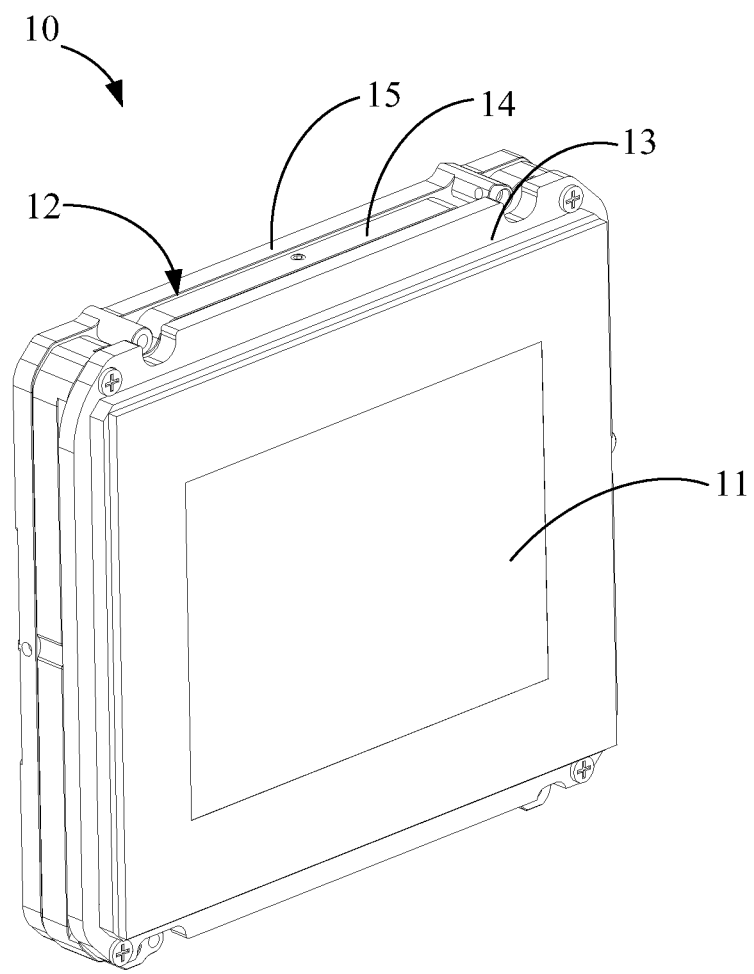
FIG. 1 illustrates a stereoscopic schematic of a photographing assembly according to exemplary embodiments of the present disclosure.

The technical solutions in the embodiments of the present disclosure are clearly and completely described in the following with reference to the accompanying drawings in the embodiments of the present disclosure. It is obvious that the described embodiments are merely a part of the embodiments of the present disclosure, but not all embodiments. All other embodiments, based on the embodiments of the present disclosure, obtained by those skilled in the art without creative efforts are within the scope of the present disclosure.

Exemplary embodiments illustrated in the accompanying drawings are described in detail herein. When the accompanying drawings are described, same numerals in different drawings refer to same or similar elements unless otherwise indicated. The embodiment methods described in the following exemplary embodiments do not represent all embodiments consistent with the present disclosure. Instead, such embodiments are merely examples of devices and methods consistent with aspects of the disclosure as detailed in the appended claims.

The terminology used in the present disclosure is merely for the purpose of describing particular embodiments and is not intended to limit the disclosure. The singular forms "a", "said", and "the" used in the present disclosure and the appended claims may also include plural forms, unless the context clearly indicates other meanings. It should also be understood that the term "and/or" as used in the present disclosure may refer to and encompass any and all possible combinations of one or more of associated listed items. Unless otherwise noted, "front", "rear", "lower" and/or "upper" and similar terms may be for ease of description only and may not be limited to one location or one spatial orientation. "Connected" or "connecting" and similar terms may not be limited to physical or mechanical connections, and may include electrical connections, whether such connections are direct or indirect.

An adjustment device described in the embodiments of the present application may include support plates and displacement adjusters. The support plate may include a frame body, an adjustment part in the frame body, and an elastic part for connecting the frame body and the adjustment part. A spacing may be between the adjustment part and the frame body, and the adjustment part may move relative to the frame body. The displacement adjuster may be abutted against the adjustment part and adjust the relative position between the adjustment part and the frame body by overcoming the elastic force of the elastic part. The adjustment device may adjust the relative position between the adjustment part and the frame body of the support plate through the displacement adjuster, thereby adjusting the position of a photosensitive element to prevent shaking and ensure image quality.

A photographing assembly described in the embodiments of the present disclosure may include the photosensitive element and the adjustment device. The adjustment device may be configured to adjust the position of the photosensitive element. The adjustment device may include the support plates and the displacement adjusters. The support plate may include the frame body, the adjustment part in the frame body, and the elastic part for connecting the frame body and the adjustment part. The adjustment part may support the photo-sensitive element. A spacing may be between the adjustment part and the frame body, and the adjustment part may move relative to the frame body. The displacement adjuster may be abutted against the adjustment part and adjust the relative position between the adjustment part and the frame body by overcoming the elastic force of the elastic part, thereby adjusting the position of the photosensitive element.

A photographing device described the embodiments of the present disclosure may include an underframe, a cover plate, and the photographing assembly. The photographing assembly installed between the underframe and the cover plate may include the photosensitive element and the adjustment device. The adjustment device may be configured to adjust the position of the photosensitive element. The adjustment device may include the support plates and the displacement adjusters. The support plate may include the frame body, the adjustment part in the frame body, and the elastic part for connecting the frame body and the adjustment part. A spacing may be between the adjustment part and the frame body, and the adjustment part may move relative to the frame body. The displacement adjuster may be abutted against the adjustment part and adjust the relative position between the adjustment part and the frame body by overcoming the elastic force of the elastic part, thereby adjusting the position of the photosensitive element.

The adjustment device, the photographing assembly, and the photographing device of the present application are described with the reference to the drawings in detail hereinafter. In the case of no conflict, the features in the following embodiments and implementations may be combined with each other.

Figure 2:
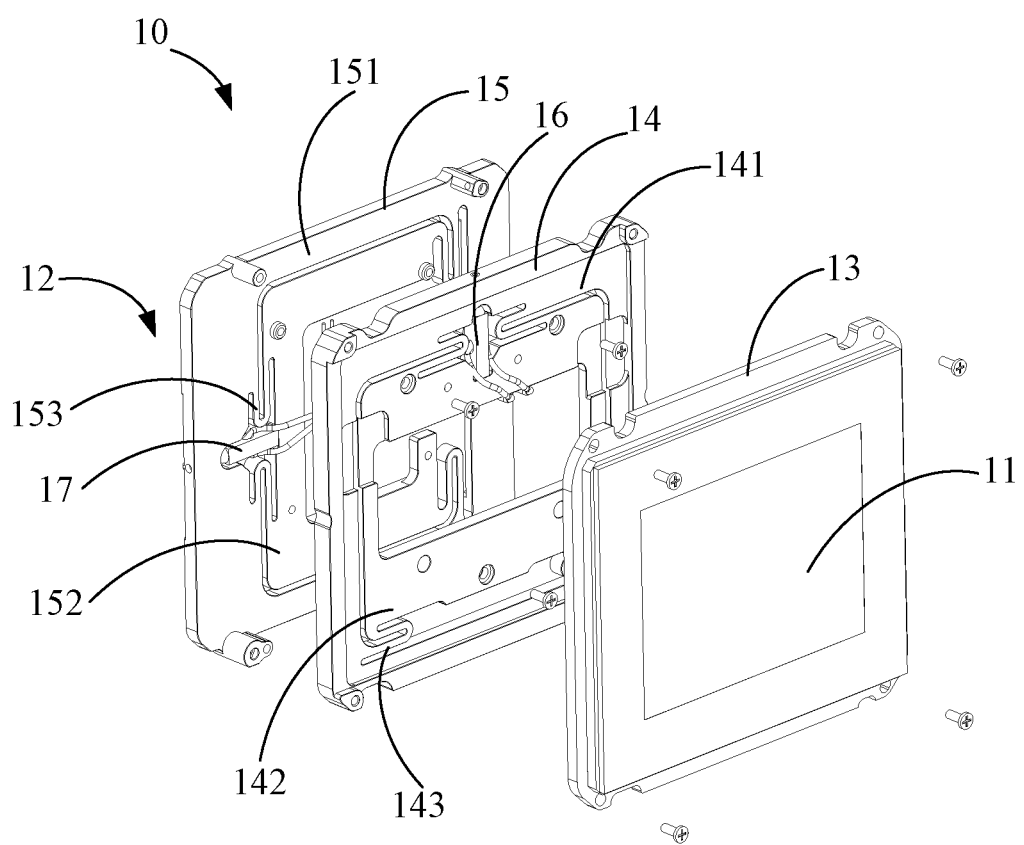
FIG. 2 illustrates a stereoscopic exploded schematic of the photographing assembly in FIG. 1.

FIG. 1 illustrates a stereoscopic schematic of a photographing assembly 10 according to exemplary embodiments of the present disclosure. FIG. 2 illustrates a stereoscopic exploded schematic of the photographing assembly 10 in FIG. 1. The photographing assembly 10 may be built into a photographing device including a camera, a video camera, a smartphone, or other devices with the photographing function.

The photographing assembly 10 may include a photosensitive element 11 and an adjustment device 12. The photosensitive element 11 may be referred to an image sensor which is a device to record light change. In one embodiment, the photosensitive element 11 may include a charge-coupled device (CCD). The CCD is made of a high-sensitivity semiconductor material and may include a plurality of photosensitive units, which is in units of megapixels. When the surface of the CCD is exposed to light, each photosensitive unit may reflect charges onto the assembly, that is, convert the light into the charges. The signals generated by all photosensitive units may be combined together to form a complete image, and then converted into digital signals which may be saved in a flash memory or a built-in hard side inside the photographing device after compression.

In another embodiment, the photosensitive element 11 may include a complementary metal-oxide-semiconductor transistor (CMOS) device. The CMOS device is a semiconductor device mainly made of silicon and germanium which makes N-type and P-type semiconductor materials coexist on the CMOS, and the current generated by the complementary effect may be recorded and interpreted as images by processing chips. The CMOS device may be mainly used in photographing devices, including mobile phones and the like.

An adjustment device 12 may be used to adjust the position of the photosensitive element 11. The photosensitive element 11 may be installed on the adjustment device 12. In some embodiments, the photographing assembly 10 may include a bracket 13 to support the photosensitive element 11. The photosensitive element 11 may be installed on the adjustment device 12 through the bracket 13. When the photographing device shakes during the photographing process due to external vibrations or shaky hands, the adjustment device 12 may adjust the position of the photosensitive element 11 to prevent shaking and ensure image quality.

The adjustment device 12 may include support plates 14 and 15 and displacement adjusters 16 and 17 installed on the support plates 14 and 15. The support plates 14 and 15 may include frame bodies 141 and 151, adjustment parts 142 and 152 in the frame bodies 141 and 151, and elastic parts 143 and 153 of the adjustment parts 142 and 152. The adjustment parts 142 and 152 and the frame bodies 141 and 151 may have spacings, and the adjustment parts 142 and 152 move relative to the frame bodies 141 and 151. The adjustment parts 142 and 152 may support the photosensitive element 11.

The displacement adjusters 16 and 17 may be abutted against the adjustment parts 142 and 152 and adjust the relative positions between the adjustment parts 142 and 152 and the frame bodies 141 and 151 by overcoming the elastic forces of the elastic parts 143 and 153. The displacement adjusters 16 and 17 may include piezoelectric actuators which may include piezoelectric ceramics or other piezoelectric materials. The piezoelectric actuators may generate mechanical deformations after an electrical field is applied, such as deformations of stretching or compression. When the voltage applied on the piezoelectric actuators is different, the deformation amplitude may be different.

In one embodiment, the displacement adjusters 16 and 17 may be connected to a drive power supply. Based on the shaking magnitude of the photographing device, the drive power supply may provide corresponding voltages to the displacement adjusters 16 and 17, such that the displacement adjusters 16 and 17 may be mechanically deformed, and the adjustment parts 142 and 152 may move in the opposite direction of the shaking direction by the same or substantially same magnitude of displacement. Therefore, the photosensitive element 11 may move in the opposite direction of the shaking direction by the same or substantially same magnitude of displacement, which may ensure that the position of the photosensitive element 11 is basically not affected by the shaking, thereby ensuring the image clarity.

In another embodiment, the displacement adjusters 16 and 17 may be mechanically deformed by the drive power supply during the photographing process to move the adjustment parts 142 and 152, thereby moving the photosensitive element 11 to implement multi shots. The photographing device may perform multiple slightly different shots by moving the photosensitive element 11, and the multiple captured images may be combined together to obtain images with more accurate details and colors. For example, the photographing assembly 10, including the adjustment device 12, may be used in a multi-shot camera which may perform 4 or 6 shots, and the photosensitive element 11 may simultaneously move one and a half pixels when the photographing is performed, thereby obtaining images with 50 or 200 megapixels.

In the embodiments shown in FIGS. 1-2, the support plates 14 and 15 may include the first support plate 14 and the second support plate 15 which are stacked with each other. The first support plate 14 may be disposed on the back of the photosensitive element 11 to support the photosensitive element 11. The second support plate 15 may be disposed on the side of the first support plate 14 facing away from the photosensitive element 11. The displacement adjusters 16 and 17 may include the first displacement adjuster 16 and the second displacement adjusters 17. The first displacement adjuster 16 may be installed on the first support plate 14, and the second adjuster 17 may be installed on the second support plate 15.

Figure 3:
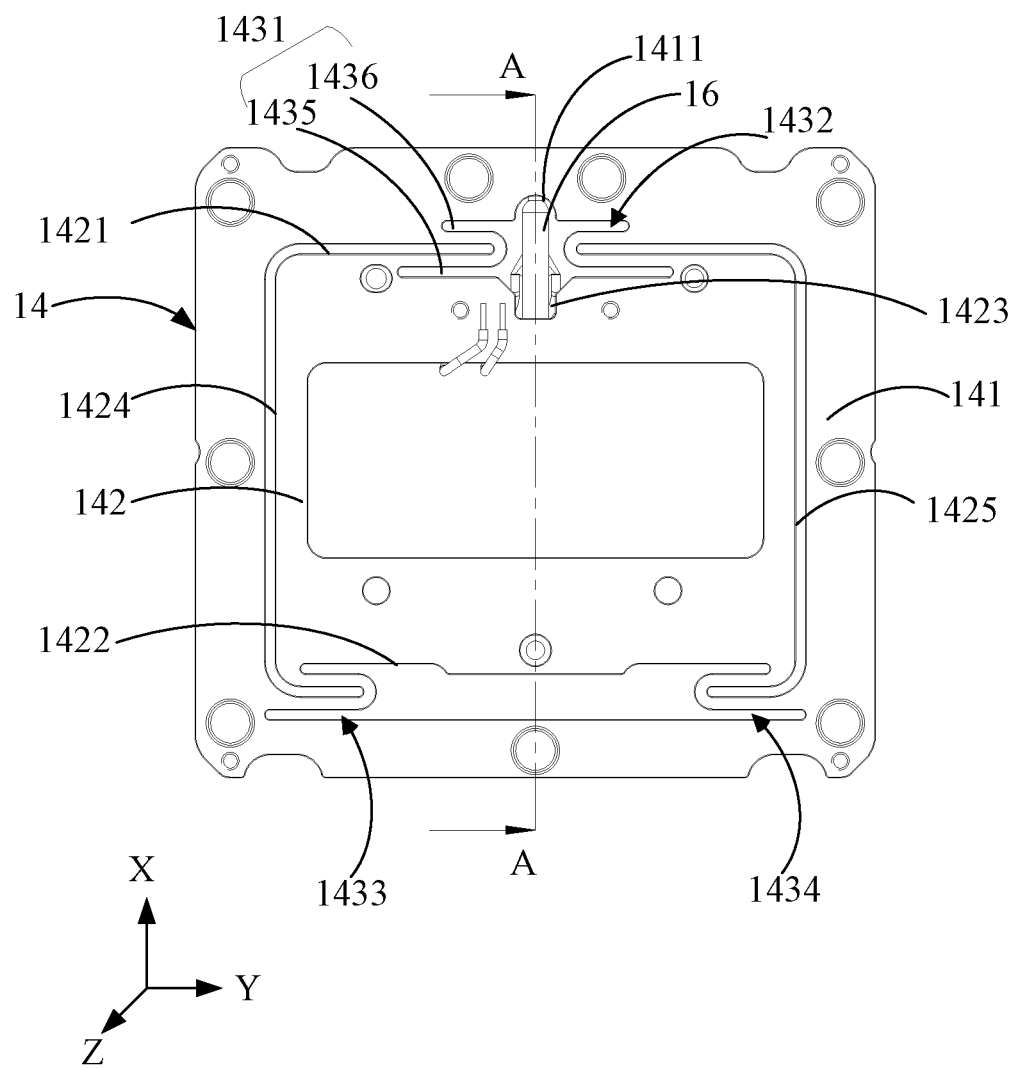
FIG. 3 illustrates a front view of a first support plate and a first displacement adjuster of an adjustment device of the photographing assembly in FIG. 1.

FIG. 3 illustrates a front view of the first support plate 14 and the first displacement adjuster 16. The first support plate 14 may include the first frame body 141, the first adjustment part 142 in the first frame body 141, and the first elastic part 143 connecting the first frame body 141 with the first adjustment part 142. The above-mentioned frame bodies may include the first frame body 141, the above-mentioned adjustment parts may include the first adjustment part 142, and the above-mentioned elastic parts may include the first elastic part 143. The first displacement adjuster 16 may be abutted against the first adjustment part 142 and adjust the relative position between the first adjustment part 142 and the first frame body 141 by overcoming the elastic force of the first elastic part 143, thereby adjusting the position of the photosensitive element 11.

The first frame body 141 may be fixed to the underframe (not shown), the cover plate (not shown), and/or other fixing parts of the photographing device. In one embodiment, the first frame body 141 may be a rectangular frame substantially, and an accommodating space surrounded by four sides may be formed in the middle. The accommodating space may be a rectangular space, which may not be limited herein. In another embodiment, the first frame body 141 may be other shapes, such as a polygon. In another embodiment, the first frame body 141 may be surrounded by three sides and be open on one side. In other embodiments, the first frame body 141 may be other shapes and structures, which may not be limited by the shapes and structures shown in the drawings and listed in the above-mentioned description.

The first adjustment part 142 and the first frame body 141 may have a spacing, and the first adjustment part 142 may move relative to the first frame body 141. In one illustrated embodiment, the first adjustment part 142 may be a rectangular shape substantially and be located in the rectangular accommodating space of the first frame body 141. The spacing between the first adjustment part 142 and the first frame body 141 may reserve sufficient space for the adjustment part 142 to move relative to the first frame body 141. In one embodiment, four sides of the first adjustment part 142 and the inner sides of the first frame body 141 may all have spacings, such that the first adjustment part 142 may move relative to the first frame body 141 in multiple directions.

The first adjustment part 142 may support the photosensitive element 11 which may be fixedly connected to the first adjustment part 142. The first adjustment part 142 may move relative to the first frame body 141 and drive the photosensitive element 11 to move jointly with the first adjustment part 142, thereby adjusting the position of the photosensitive element 11. In one illustrated embodiment, the first adjustment part 142 may be a rectangular frame surrounded by four sides. In other embodiments, the first adjustment part 142 may be other shapes.

The first adjustment part 142 may include a first side 1421 abutted against by the first displacement adjuster 16 and a second side 1422 opposite to the first side 1421. The first adjustment part 142 may be recessed in the first side 1421 to form an adjustment part opening 1423, and one end of the first displacement adjuster 16 may extend into the adjustment part opening 1423 and be abutted against the inner side of the adjustment part opening 1423. In one illustrated embodiment, the first frame body 141 may be recessed opposite to the inner side of the adjustment part opening 1423 to form a frame body opening 1411 and another end of the first displacement adjuster 16 may extend into the frame body opening 1411.

The elastic parts 143 and 153 may be located on the side where the adjustment parts 142 and 152 are abutted against the corresponding displacement adjusters 16 and 17 and on the opposite side thereof, as shown in FIG. 2. Referring to FIG. 3, the first elastic part 143 may be located on the side where the first adjustment part 142 is abutted against the first displacement adjuster 16 and on the opposite side thereof. In one illustrated embodiment, the first elastic part 143 may be located on the first side 1421 and the opposite second side 1422 of the first adjustment part 1421. The first elastic part 143 may include first side elastic parts 1431 and 1432 which are on the first side 1421 of the first adjustment part 142. The first side elastic parts 1431 and 1432 may be respectively located on two opposite sides of the first displacement adjuster 16 and may elastically connect the first side 1421 of the first adjustment part 142 and the inner side of the first frame body 141. The first side elastic parts 1431 and 1432 may be disposed symmetrically relative to the central axis of the first adjustment part 142. In one illustrated embodiment, the first displacement adjuster 16 may be located in the middle of the first side 1421 of the first adjustment part 142. The first side elastic parts 1431 and 1432 may be disposed adjacent to the first displacement adjuster 16 and approximately located at the middle of the first side 1421 of the first adjustment part 142. In another embodiment, the first side elastic parts 1431 and 1432 may be disposed at the positions close to the corners of the first side 1421, that is, the positions of the first side 1421 close to the third side 1424 and the fourth side 1425 adjacent to the third side 1424.

The first elastic part 143 may include second side elastic parts 1433 and 1434 on the second side 1422 of the first adjustment part 142. In one illustrated embodiment, the second side elastic parts 1433 and 1434 may be at the corner positions of the second side 1422, that is, the positions of the second side 1422 close to the third side 1424 and the fourth side 1425 adjacent to the third side 1424. In another embodiment, the second side elastic parts 1433 and 1434 may be approximately located at the middle of the second side 1422. The second side elastic parts 1433 and 1434 may be disposed symmetrically relative to the central axis of the first adjustment part 142 and may elastically connect the second side 1422 of the first adjustment part 142 and the inner side of the first frame body 141.

The first elastic part 143 may extend from the side of the first adjustment part 142 and extend along the side. A spacing may be between the first elastic part 143 and each of the first adjustment part 142 and the first frame body 141, which may reserve space for the elastic deformation of the first elastic part 143. For example, the first side elastic parts 1431 and 1432 may respectively extend around the first side 1421 of the first adjustment part 142 and extend along the first side 1421, and a spacing may be between the first side 1421 and the first frame body 141. The second side elastic parts 1433 and 1434 may respectively extend from the second side 1422 of the first adjustment part 1422 and extend along the second side 1422, and a spacing may be between the second side 1422 and the first frame body 141. The elastic direction of the first elastic part 143 may mainly be in the adjustment direction of the first displacement adjuster 16.

In one illustrated embodiment, the first elastic part 143 may include an extension section extending along the side of the first adjustment part 142, and a folded section folded back from the extension section, and a spacing may be between the folded section and the extension section. For example, taking the first side elastic part 1431 as an example, the first side elastic part 1431 may include an extension section 1435 extending along the first side 1421 of the first adjustment part 142, and a folded section 1436 folded back from the extension section 1435, and a spacing may be between the folded section 1436 and the extension section 1435. In one illustrated embodiment, the extension section 1435 of the first side elastic part 1431 may extend from the first side 1421, and a spacing may be between the extension section 1435 and the first side 1421. The spacing may extend along the first side 1421 to reserve space for the elastic deformation. The extension section 1435 may extend along the first side 1421 toward the first displacement adjuster 16. The folded section 1436 may be folded back at one end of the extension section 1435 adjacent to the first displacement adjuster 16. The folded section 1436 may have a direction opposite to the extending direction of the extension section 1435 and extend along the direction away from the first displacement adjuster 16. The folded section 1436 may extend to be connected with the first frame body 141, and a spacing may be between the folded section 1436 and the first frame body 141. The spacing may extend along the inner side of the first frame body 141 to reserve space for the elastic deformation. In another embodiment, the first side elastic part 1431 may include a plurality of extension sections 1435 and folded sections 1436 to make the first side elastic part 1431 more elastic. In other embodiments, the first side elastic part 1432 may be other shapes.

In one illustrated embodiment, another first side elastic part 1432 on the first side 1421 may have a structure similar to the first side elastic part 1431. In other embodiments, the first side elastic part 1432 may have a structure different from the first side elastic part 1431, and the second side elastic parts 1433 and 1434 may have structures similar to the first side elastic part 1431. In one illustrated embodiment, the second side elastic parts 1433 and 1434 may be respectively connected to the inner sides of the first frame body 141 relative to the third side 1424 and the fourth side 1425. In other embodiments, the second elastic parts 1433 and 1434 may have other structures.

The above-mentioned embodiment may merely be an example of the first elastic part 143, and the first elastic part 143 may not be limited by the above-mentioned embodiment and may be other shapes or structures. The first elastic part 143, the first frame body 141 and the first adjustment part 142 may be substantially located on a same plane. In one embodiment, the first elastic part 143, the first frame body 141 and the first adjustment part 142 may be formed into one single piece. In another embodiment, the first elastic part 143 may include an elastic member (e.g., an elastic piece and a spring) and may be abutted between the first frame body 141 and the adjustment part 142.

Referring to FIG. 3, the adjustment direction of the first displacement adjuster 16 may be consistent with the moving direction of the first adjustment part 142 relative to the first frame body 141. In one illustrated embodiment, the first displacement adjuster 16 may be between the first frame body 141 and the first adjustment part 142 and adjust the position of the first adjustment part 142 relative to the first frame body 141. In one illustrated embodiment, the extending direction of the first displacement adjuster 16 may be in parallel with the first support plate 14, and the adjustment direction of the first displacement adjuster 16 may be in parallel with the first support plate 14, such that the first adjustment part 142 may move in the plane where the first adjustment part 142 is located. In one illustrated embodiment, the first displacement adjuster 16 may be disposed along an X direction and abutted against the first adjustment part 142 along the X direction. The first displacement adjuster 16 may be mechanically deformed by stretching or compression along the X direction, and the adjustment direction of the first displacement adjuster 16 is the X direction. The action of the first displacement adjuster 16 may be combined with the elastic force of the first elastic part 143 to move the first adjustment part 142 along the X direction. In other embodiments, the adjustment direction of the first adjuster 16 may include other directions.

When the first displacement adjuster 16 is stretched, the first displacement adjuster 16 may push the first adjustment part 142 to move away from the first displacement adjuster 16. When the first displacement adjuster 16 is compressed, the elastic force of the first elastic part 143 may push the first adjustment part 142 to move closer to the first displacement adjuster 16.

Figure 4:
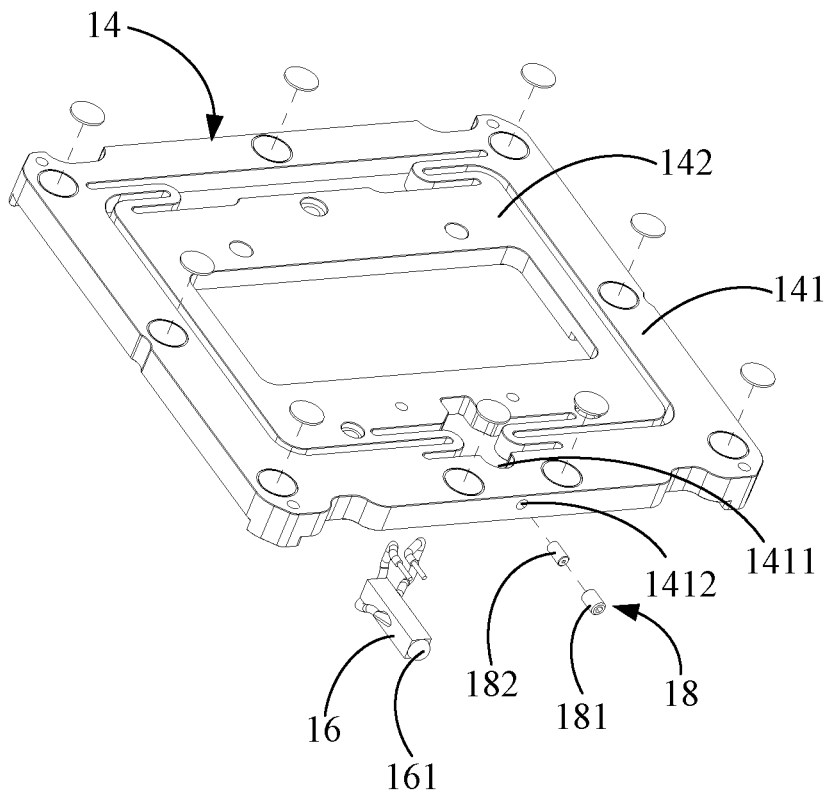
FIG. 4 illustrates a stereoscopic exploded schematic of the first support plate and the first displacement adjuster in FIG. 3.
Figure 5:
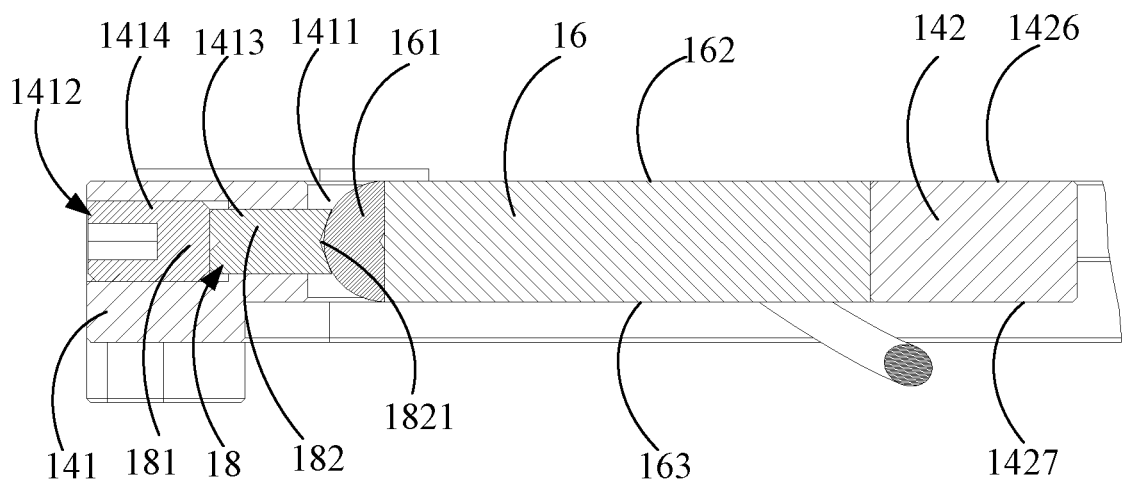
FIG. 5 illustrates a local cross-sectional schematic along a line A-A in FIG. 3.

FIG. 4 illustrates a stereoscopic exploded schematic of the first support plate 14 and the first displacement adjuster 16 in FIG. 3. FIG. 5 illustrates a local cross-sectional schematic along the line A-A in FIG. 3. Referring to FIGS. 4-5, the adjustment device 12 may include a first installation assembly 18 for installing the first displacement adjuster 16 on the first support plate 14. The first installation assembly 18 may be abutted against the first displacement adjuster 16, such that the first displacement adjuster 16 may be abutted against the first adjustment part 142 to adjust the pre-tightening force of the first elastic part 143. The first installation assembly 18 may be abutted against one end of the first displacement adjuster 16, the other end of the first displacement adjuster 16 may be abutted against the first adjustment part 142, and the first adjustment part 142 may be abutted against the first frame body 141 through the first elastic part 143; through the abutting force of the first installation assembly 18 and the elastic force of the first elastic part 143, the first displacement adjuster 16 may be clamped between the first frame body 141 and the first adjustment part 142, thereby installing the first displacement adjuster 16 on the first support plate 14.

Furthermore, the first installation assembly 18 may be adjusted to adjust the position of the first displacement adjuster 16 in the first frame body 141, thereby adjusting the pre-tightening force of the first elastic part 143; and the position of the first adjustment part 142 in the first frame body 141 may be adjusted, thereby adjusting the initial position of the photosensitive element 11.

In one illustrated embodiment, a first installation through hole 1412, passing through the outer side and the inner side of the first frame body 141, may be formed in the first frame body 141, and the first installation assembly 18 may be inserted into the first installation through hole 1412. The first installation through hole 1412 and the frame body opening 1411 may be connected with each other. In one illustrated embodiment, the first installation through hole 1412 may include an inner section 1413 and an outer section 1414 connecting with the inner section 1413. The outer section 1414 may be formed inwardly from the outer side of the first frame body 141, and the inner section 1413 may be connected with the outer section 1414 and the inner side of the first frame body 141 and be connected with the frame body opening 1411. In one illustrated embodiment, the inner diameter of the outer section 1414 may be greater than the inner diameter of the inner section 1413.

In one illustrated embodiment, the first installation assembly 18 may include a stop bolt 181 and a fitting element 182 which abuts against the stop bolt 181 and matches one end of the first displacement adjuster 16. The stop bolt 181 may be installed in the first installation through hole 1412 of the first frame body 141 and push against the fitting element 182. The fitting element 182 may be inserted into the first installation through hole 1412 and may protrude out of the first installation through hole 1412 from the inner side of the first frame body 141, and the fitting element 182 may be capable of protruding into the frame body opening 1411. The length of the fitting element 182 protruding into the frame body opening 1411 may be adjusted by rotating the stop bolt 181, thereby adjusting the initial position of the first displacement adjuster 16 and the pre-tightening force of the first elastic part 143.

In one illustrated embodiment, the stop bolt 181 may be movably installed on the outer section 1414 of the first installation through hole 1412, and the fitting element 182 may be movably inserted into the inner section 1413. When the stop bolt 181 is not rotated into the deepest location of the outer section 1414, the end of the fitting element 181 may enter the outer section 1414 from the inner section 1413 to be abutted against the stop bolt 181. The outer diameter of the stop bolt 181 may be consistent with the inner diameter of the outer section 1414, and the outer diameter of the fitting element 182 may be consistent with the inner diameter of the inner section 1413. The outer diameter of the fitting element 182 may be smaller than the outer diameter of the stop bolt 181. The outer section 1414 may limit the maximum depth which the stop bolt 181 is rotated into. Therefore, the maximum length of the fitting element 182 protruding into the frame body opening 1411 may be restricted, and the fitting element 182 may be prevented from protruding overly to generate the excessive pre-tightening force of the first elastic part 143.

In one illustrated embodiment, a semi-circular protrusion 161 may be disposed on one end of the first displacement adjuster 16, and the end of the fitting element 182 may be recessed to form a core-shaped recessed portion 1821. The top of the protrusion 161 may be abutted against the recessed portion 1821, such that the end of the fitting element 182 may be matched with the first displacement adjuster 16 for limitation.

In one embodiment, the surface of the first displacement adjuster 16 may not exceed the corresponding surface of the first adjustment part 142. In one illustrated embodiment, the surface of the first displacement adjuster 16 may be coplanar with the surface of the first adjustment part 142. The thickness of the first displacement adjuster 16 may be equal to the thickness of the first adjustment part 142. A first surface 162 of the first displacement adjuster 16 facing away from the second support plate 15 (shown in FIG. 2) may be coplanar with a first surface 1426 of the first adjustment part 142 facing away from the second support plate 15. A second surface 163 of the first displacement adjuster 16 opposite to the first surface 162 may be coplanar with a second surface 1427 of the first adjustment part 142 opposite to the first surface 1426. In another embodiment, the surface of the first displacement adjuster 16 may slightly exceed the corresponding surface of the first adjustment part 142. The height of the surface of the first displacement adjuster 16 exceeding the corresponding surface of the first adjustment part 142 may not greater than 0.15 mm. The first displacement adjuster 16 may not affect the stacked assembly of the first support plate 14, the second support plate 15, and the photosensitive element 11.

Figure 6:
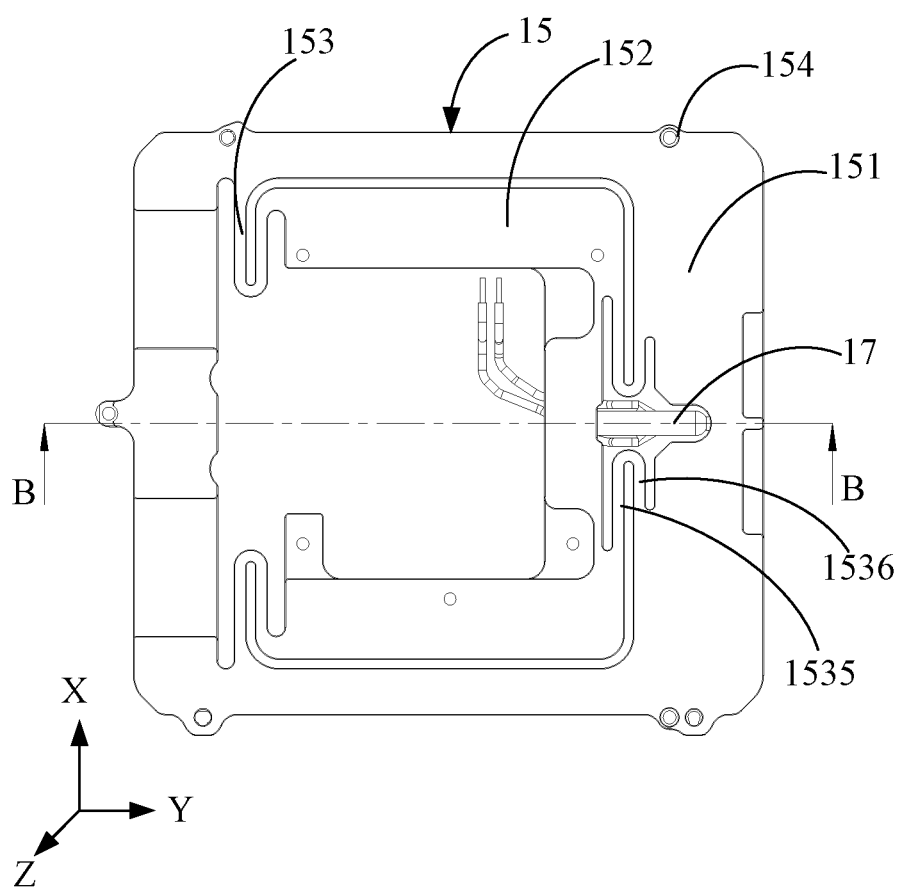
FIG. 6 illustrates a front view of a second support plate and a second displacement adjuster of an adjustment device of the photographing assembly in FIG. 1.

FIG. 6 illustrates a front view of the second support plate 15 and the second displacement adjuster 17. The second support plate 15 may include a second frame body 151, a second adjustment part 152 in the second frame body 151, and a second elastic part 153 connecting the second frame body 151 with the second adjustment part 152. The above-mentioned frame bodies may include the second frame body 151, the above-mentioned adjustment parts may include the second adjustment part 152, and the above-mentioned elastic parts may include the second elastic part 153. The second displacement adjuster 17 may be abutted against the second adjustment part 152 and overcome the elastic force of the second elastic part 153 to adjust the relative position between the second adjustment part 152 and the second frame body 151, thereby adjusting the position of the photosensitive element 11.

Figure 7:
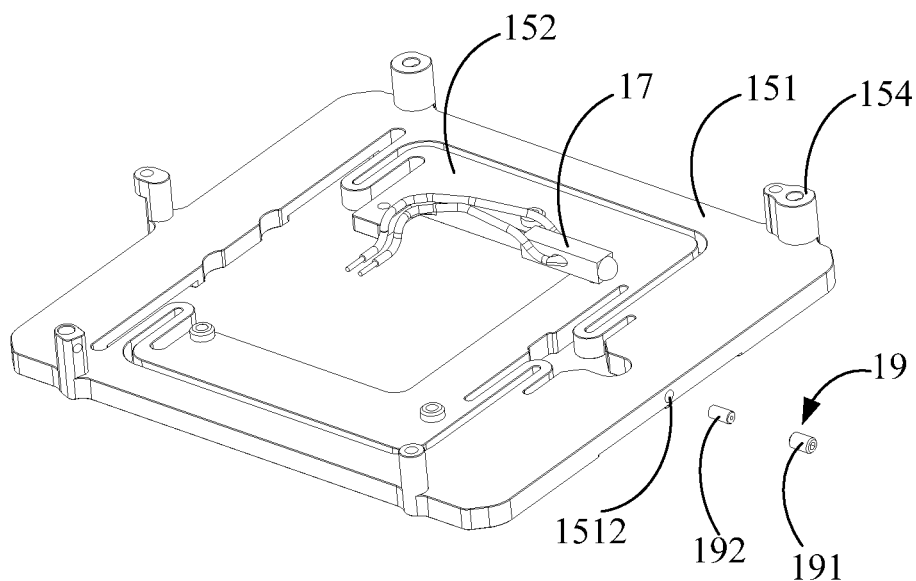
FIG. 7 illustrates a stereoscopic exploded schematic of the second support plate and the second displacement adjuster in FIG. 6.

The second frame body 151 may be fixed to the underframe (not shown), the cover plate (not shown), and/or other fixing parts. A plurality of protrusive fixing columns 154 may be disposed on the side of the second frame body 151. As shown in FIG. 7, the second frame body 151 may be fixedly installed on the cover plate and other parts through the cooperation of the fixing columns 154 and screws (not shown). The second frame body 151 may be fixedly connected to the first frame body 141.

In one embodiment, the shapes and structures of the second frame body 151 and the first frame body 141 may be substantially same. The second frame body 151 may also be a rectangular frame substantially, and an accommodating space surrounded by four sides may be formed in the middle, which may not be described in detail herein. In other embodiments, the second frame body 151 may have a shape and a structure different from the first frame body 141.

A spacing may be between the second adjustment part 152 and the second frame body 151, and the second adjustment part 152 may move relative to the second frame body 151. In one illustrated embodiment, the second adjustment part 152 may substantially be a rectangular frame with three surrounding sides and one opening side and may be in the rectangular accommodation space of the second frame body 151. In another embodiment, the second adjustment part 152 may be similar to the first adjustment part 142 and may substantially be a rectangular frame surrounded by four sides. Similar to the first adjustment part 142, the spacings between the four sides of the second adjustment part 152 and the inner sides of the second frame body 152 may reserve space for the second adjustment part 152 to move in multiple directions, such that the second adjustment part 152 may move relative to the second frame body 152 in multiple directions.

Referring to FIG. 3, the second adjustment part 152 may be connected to the first adjustment part 152. When the second adjustment part 152 moves, the second adjustment part 152 may drive the first adjustment part 142 to move, thereby moving the photosensitive element 11 disposed on the first adjustment part 142. When the first adjustment part 142 moves, the second adjustment part 152 may also move accordingly.

Referring to FIG. 6, in one illustrated embodiment, the second elastic part 153 may be similar to the first elastic part 143. The second elastic part 153 may be on the side where the second adjustment part 152 is abutted against the second displacement adjuster 17 and on the opposite side thereof. The second elastic part 153 may extend around the side of the second adjustment part 152 and extend along such side. A spacing may be between the second elastic part 153 and each of the second adjustment part 152 and the second frame body 151. In some embodiments, the second elastic part 153 may include an extension section 1535 extending along the side of the second adjustment part 152 and a folded section 1536 which is folded back from the extension section 1535. A spacing may be between the folded section 1536 and the extension section 1535. In some embodiments, the second elastic part 153, the second frame body 151 and the second adjustment part 152 may be formed into one single piece. The second elastic part 153, the second frame body 151 and the second adjustment part 152 may be substantially in a same plane. For the detailed description of the second elastic part 153, reference may be made to the specific description of the first elastic part 143, which may not be described in detail herein. In other embodiments, the second elastic part 153 may have a shape and a structure different from the first elastic part 143.

In one illustrate embodiment, similar to the first displacement adjuster 16, the second displacement adjuster 17 may be between the second frame 151 and the second adjustment part 152 to adjust the position of the second adjustment part 152 relative to the second frame body 151. The adjustment direction of the second displacement adjuster 17 may be consistent with the movement direction of the second adjustment part 152 relative to the second frame body 151. In one illustrated embodiment, the extending direction of the second displacement adjuster 17 may be in parallel with the second support plate 15, and the adjustment direction of the second displacement adjuster 17 may be in parallel with the second support plate 15, such that the second adjustment part 152 may move in the plane where the second adjustment part 152 is located.

Referring to FIG. 3, the adjustment direction of the first displacement adjuster 16 may intersect the adjustment direction of the second displacement adjuster 17. The first displacement adjuster 16 and the second displacement adjuster 17 may have different adjustment directions and move the photosensitive element 11 along different directions. The adjustment direction of the first displacement adjuster 16 and the adjustment direction of the second displacement adjuster 17 may both in parallel with the support plates 14 and 15, such that the photosensitive element 11 may move in the two-dimensional plane.

In one embodiment, the adjustment direction of the first displacement adjuster 16 may be orthogonal to the adjustment direction of the second displacement adjuster 17. In one illustrated embodiment, the second displacement adjuster 17 may be disposed along the Y direction and abutted against the second adjustment part 152 along the Y direction. The second adjustment adjuster 17 may be mechanically deformed by stretching or compression along the Y direction, and the adjustment direction of the second displacement adjuster 17 may be the Y direction. The action of the second displacement adjuster 17 may be combined with the action of the elastic force of the second elastic part 153 to move the second adjustment part 152 along the Y direction. In other embodiments, the adjustment direction of the second adjuster 17 may include other directions.

The adjustment directions of the displacement adjusters 16 and 17 may be consistent with the moving directions of the corresponding adjustment parts 142 and 152. The adjustment directions of the displacement adjusters 16 and 17 may be in a X-Y two-dimensional plane, such that the adjustment parts 142 and 152 may move in the two-dimensional plane. The spacings between the adjustment parts 142 and 152 and the corresponding frame bodies 141 and 151 may reserve space for movement which may prevent the adjustment parts 142 and 152 from pushing the frame bodies 141 and 151 after the adjustment parts 142 and 152 move, thereby avoiding the deformation of the adjustment parts 142 and 152 and the frame bodies 141 and 151 along the Z-direction perpendicular to the X-Y plane. The Z-direction is the direction perpendicular to the photosensitive element 11. The adjustment device 12 may avoid the displacement of the photosensitive element 11 along the Z-direction when the photosensitive element 11 moves in the X-Y plane, such that the flange focal distance from the photosensitive element 11 to the lens may be prevented from changing, thereby ensuring stable image forming.

Figure 8:
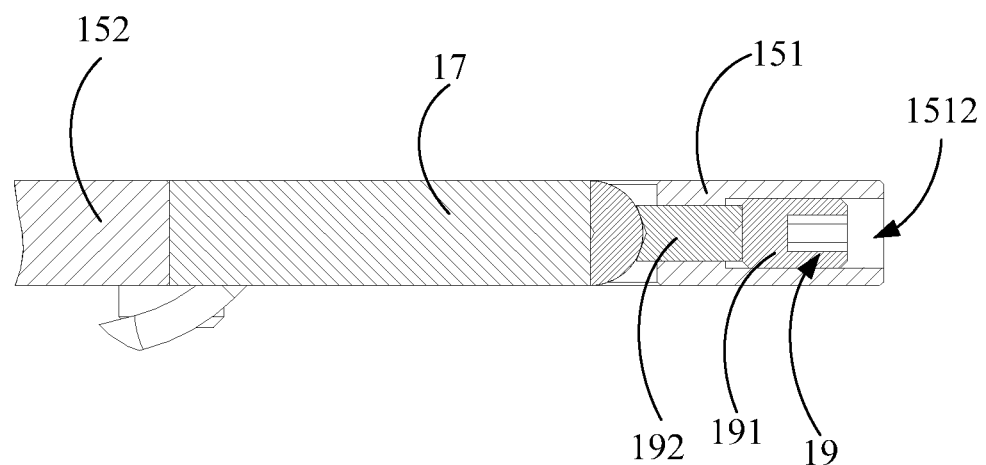
FIG. 8 illustrates a local cross-sectional schematic along a line B-B in FIG. 6.

FIG. 7 illustrates a stereoscopic exploded schematic of the second support plate 15 and the second displacement adjuster 17 in FIG. 6. FIG. 8 illustrates a local cross-sectional schematic along the line B-B in FIG. 6. Referring to FIGS. 7-8, the adjustment device 12 may include a second installation assembly 19 which installs the second displacement adjuster 17 to the second support plate 15. The second installation assembly 19 may be abutted against the second displacement adjuster 17, such that the second displacement adjuster 17 may be abutted against the second adjustment part 152 and configured to adjust the pre-tightening force of the second elastic part 153. The second installation assembly 19 is similar to the first installation assembly 18, and the detailed description of the second installation assembly 19 may refer to the description of the first installation assembly 18, which may not be described in detail herein.

In one illustrated embodiment, similar to the first installation through hole 1412 formed at the first frame body 141, a second installation through hole 1512 may be formed at the second frame body 151. The second installation assembly 19 may be inserted into the second installation through hole 1512. The structure of the second installation through hole 1512 may be similar to the structure of the first installation through hole 1412, and the detailed description of the second installation through hole 1512 may refer to the description of the first installation through hole 1412, which may not be described in detail herein. Moreover, the assembly relationship between the second installation assembly 19 and the second installation through hole 1512 may be similar to the assembly relationship between the first installation assembly 18 and the first installation through hole 1412.

In other embodiments, the installation manner of the second displacement adjuster 17 may be different from that of the first displacement adjuster 16. The shape and structure of the second installation assembly 19 may be different from the shape and structure of the first installation assembly 18. The shape and structure of the second installation through hole 1512 may be different from the shape and structure of the first installation through hole 1412. The assembly relationship between the second installation assembly 19 and the second installation through hole 1512 may be different from the assembly relationship between the first installation assembly 18 and the first installation through hole 1412.

In one embodiment, similar to the height relationship between the surface of the first displacement adjuster 16 and the corresponding surface of the first adjustment part 142, the surface of the second displacement adjuster 17 may not exceed the surface of the second adjustment part 152. In one embodiment, the surface of the second displacement adjuster 17 may be coplanar with the surface of the second adjustment part 152. In another embodiment, the surface of the second displacement adjuster 17 may exceed the surface of the second adjustment part 152. The height of the surface of the second displacement adjuster 17 exceeding the corresponding surface of the second adjustment part 152 may not greater than 0.15 mm.

Figure 9:
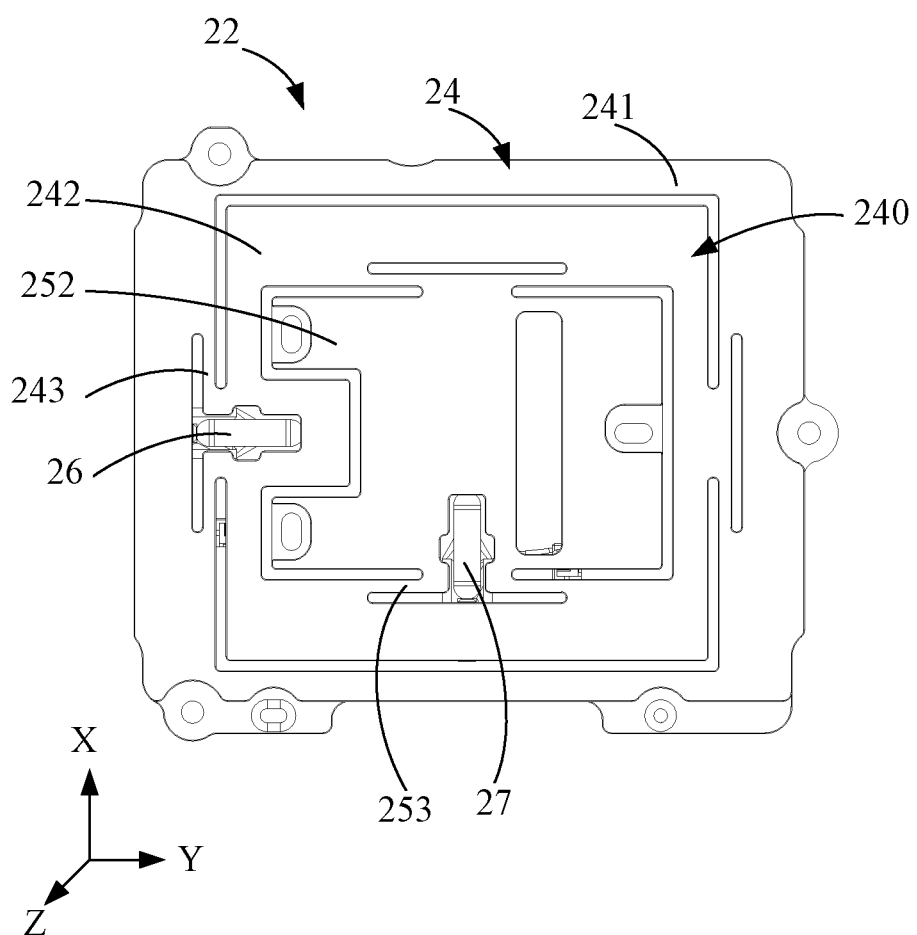
FIG. 9 illustrates a front view of an adjustment device of a photographing assembly according to exemplary embodiments of the present disclosure.

FIG. 9 illustrates a front view of an adjustment device 22 in another embodiment. The adjustment device 22 may be similar to the adjustment device 12 shown in FIGS. 1-8. Compared with the adjustment device 12, the main difference of the adjustment device 12 shown in FIG. 9 is the following. The adjustment device 22 may include a support plate 24 which includes a frame body 241 and an adjustment part 240 in the frame body. The adjustment part 240 may include a first adjustment part 242 in the frame body 241 and a second adjustment part 252 in the first adjustment part 242. The elastic part may include a first elastic part 243, connecting the frame body 24 with the first adjustment part 242, and a second elastic part 253, connecting the first adjustment part 242 with the second adjustment part 252. The displacement adjuster may include a first displacement adjuster 26, which is between the frame body 241 and the first adjustment part 242, and a second displacement adjuster 27, which is between the first adjustment part 242 and the second adjustment part 252.

The frame body 241 may have the shape and structure similar to the shape and structure of the first frame body 141 and the second frame body 151 or have different shapes and structures. The frame body 241 may be fixed to the underframe and other assemblies of the photographing device.

The photosensitive element 11 may be fixedly installed on the adjustment part 240. The photosensitive element 11 may be fixedly connected to each of the first adjustment part 242 and the second adjustment part 252. An accommodation space may be formed in the middle of the first adjustment part 242 to accommodate the second adjustment part 252. In one embodiment, the first adjustment part 242, the second adjustment part 252 and the frame body 241 may be in a same plane.

A spacing may be between the first adjustment part 242 and the frame body 151, and a spacing may be between the second adjustment part 252 and the first adjustment part 242. A spacing may be between each of the four sides of the first adjustment part 242 and the frame body 151. A spacing may be between each of the four sides of the second adjustment part 252 and the first adjustment part 242. The first adjustment part 242 may move relative the frame body 151, and the spacing between the first adjustment part 242 and the frame body 151 may provide sufficient movement space. When the first adjustment part 242 moves, the second adjustment part 252 may move accordingly. The movement of the second adjustment part 252 may drive the first adjustment part 242 to move, and the spacing between the first adjustment part 242 and the second adjustment part 252 may provide sufficient movement space.

The first displacement adjuster 26 may be abutted against the first adjustment part 242 to adjust the position of the first adjustment part 242 relative to the frame body 241. In one embodiment, the first displacement adjuster 26 may be installed between the frame body 241 and the first adjustment part 242 through an installation assembly (not shown) inserted into the frame body 241. The installation assembly may be similar to the first installation assembly 18 and the second installation assembly 19.

The second displacement adjuster 27 may be abutted against the second adjustment part 252 to adjust the position of the second adjustment part 252 relative to the frame body 241. In one embodiment, the second displacement adjuster 27 may be installed between the first adjustment part 242 and the second adjustment part 252 through another installation assembly (not shown) inserted into the first adjustment part 242. The installation assembly may be similar to the first installation assembly 18 and the second installation assembly 19.

In one embodiment shown in FIG. 9, the first displacement adjuster 26 and the second displacement adjuster 28 may be located on two adjacent sides of the first adjustment part 242. The extending directions of the first displacement adjuster 26 and the second displacement adjuster 27 may intersect with each other, and the adjustment directions of the first displacement adjuster 26 and the second displacement adjuster 27 may intersect with each other. In one embodiment, the extending directions of the first displacement adjuster 26 and the second displacement adjuster 27 may be orthogonal to each other, and the adjustment directions of the first displacement adjuster 26 and the second displacement adjuster 27 may be orthogonal to each other. In one illustrated embodiment, the first displacement adjuster 26 may extend and be disposed along the Y direction, and the adjustment direction may be along the Y direction. The second displacement adjuster 27 may extend and be disposed along the X direction, and the adjustment direction may be along the X direction.

Two adjustment parts 242 and 252 may be formed on one support plate 22, and the displacement adjusters 26 and 27 may be disposed to push the adjustment parts 242 and 252 to move along different directions, thereby adjusting the position of the photosensitive element in the X-Y two-dimensional plane. No deformation or displacement along the Z direction may be generated during the adjustment process, thereby prevent shaking and ensuring the image clarity.

In one embodiment shown in FIG. 9, the first elastic part 243 may extend along the side of the first adjustment part 242 and may form the spacings with the side of the first adjustment part 242 and the inner side of the frame body 241 to provide deformation space. The shape of the second elastic part 253 may be similar to the shape of the first elastic part 243. The first elastic part 243 may be disposed on the side where the first displacement adjuster 26 is disposed and the opposite side thereof. The second elastic part 253 may be disposed on two other opposite sides of the first adjustment part 242, that is, the side where the second displacement adjuster 27 is disposed and the opposite side thereof. In another embodiment, the first elastic part 243 and the second elastic part 253 may have a structure and a shape similar to the first elastic part 143 and the second elastic part 153.

The photographing device in one embodiment of the present application may include the underframe, the cover plate, and the photographing assembly installed between the underframe and the cover plate. The photographing device may a device including a camera, a video game, a smartphone, and the like. In one embodiment, the photographing device may be a camera. The photographing device may be used separately and may also be installed on a handheld gimbal or drone for use. The photographing assembly may be the photographing assemblies 12 and 22 at the above-mentioned embodiments.

The support plates described in the claims and the specification of the present application may include the first support plate 14, the second plate 15, and/or the support plate 24. The frame bodies may include the first frame body 141 and/or the second frame body 152 or include the frame body 241. The adjustment parts may include the first adjustment part 142 and/or the second adjustment part 152 or include the first adjustment part 242 and/or the second adjustment part 252. The elastic parts may include the first elastic part 143 and/or the second elastic part 153 or include the first elastic part 243 and/or the second elastic part 253. The displacement adjusters may include the first displacement adjuster 16 and/or the second displacement adjuster 17 or include the first displacement adjuster 26 and/or the second displacement adjuster 27. The installation assemblies may include the first installation assembly 18 and/or the second installation assembly 19. The installation through holes may include the first installation through hole 1412 and/or the second installation through hole 1512.

It should be noted that, in the present disclosure, relationship terms such as first, second and the like may be merely used to distinguish one entity or operation from another entity or operation, and may not necessarily require or imply any such relationship or sequence between the entities or operations. The terms "including", "comprising" or other variants thereof are intended to encompass non-exclusive inclusions, thus a process, a method, an item or an device including a series of elements may include such elements, but also include other elements which are not explicitly listed, or include elements which are inherent to the process, the method, the item, or the device. Without additional restrictions, elements defined by the phrase "include a . . . " does not exclude the presence of additional same elements in the process, the method, the item, or the device including the series of elements.

The methods and devices provided by the embodiments of the present disclosure have been described in detail above. The principles and embodiment methods of the present disclosure are described with reference to specific embodiments, and the description of the above-mentioned embodiments is merely for understanding the essential concept of the present disclosure. Meanwhile, the implementation manner and the application scope may be changed by those skilled in the art according to the concept of the present disclosure. The contents of the specification should not be construed as limiting the scope of the disclosure.

The content disclosed in the patent document contains materials which are subject to copyright protection, and the copyright is owned by the copyright owner. The copyright owner has no objection to the facsimile reproduction by anyone of the patent document or the patent disclosure as it appears in the official records and archives of the patent and trademark office.

What is claimed is:

1. A photographing device, comprising:
   an underframe;
   a cover plate; and
   a photographing assembly, installed between the underframe and the cover plate, wherein:
   the photographing assembly includes a photosensitive element and an adjustment device configured to adjust a position of the photosensitive element, and the adjustment device includes:
     a plurality of support plates, each including a frame body, an adjustment part in the frame body, and an elastic part for connecting the frame body with the adjustment part, wherein the adjustment part supports the photosensitive element, a spacing is between the adjustment part and the frame body, the adjustment part is able to move relative to the frame body, and the elastic part, the frame body, and the adjustment part are formed into one single piece; and
     a plurality of displacement adjusters, wherein a displacement adjuster is abutted against the adjustment part and configured to overcome an elastic force of the elastic part, adjust a relative position between the adjustment part and the frame body, and adjust the position of the photosensitive element.

2. The photographing device according to claim 1, wherein:
   an adjustment direction of the displacement adjuster is consistent with a moving direction of the adjustment part relative to the frame body.

3. The photographing device according to claim 1, wherein:
   the plurality of displacement adjusters includes a first displacement adjuster and a second displacement adjuster; and
   an adjustment direction of the first displacement adjuster intersects an adjustment direction of the second displacement adjuster.

4. The photographing device according to claim 3, wherein:
   the adjustment direction of the first displacement adjuster is orthogonal to the adjustment direction of the second displacement adjuster.

5. The photographing device according to claim 4, wherein:
   both adjustment directions of the first displacement adjuster and the second displacement adjuster are in parallel with a support plate of the plurality of support plates.

6. The photographing device according to claim 1, wherein:
   the plurality of support plates includes a first support plate and a second support plate stacked with each other.

7. The photographing device according to claim 6, wherein:
   the first support plate includes a first frame body, a first adjustment part in the first frame body, and a first elastic part connecting the first frame body with the first adjustment part; and
   the plurality of displacement adjusters includes a first displacement adjuster which is between the first frame body and the first adjustment part to adjust a position of the first adjustment part relative to the first frame body.

8. The photographing device according to claim 7, wherein:
   the second support plate includes a second frame body, a second adjustment part in the second frame body, and a second elastic part connecting the second frame body with the second adjustment part; and the plurality of displacement adjusters includes a second displacement adjuster which is between the second frame body and the second adjustment part to adjust a position of the second adjustment part relative to the second frame body.

9. The photographing device according to claim 8, wherein:
the first adjustment part is fixedly connected to the second adjustment part.

10. A photographing device comprising:
an underframe;
a cover plate; and
a photographing assembly, installed between the underframe and the cover plate, wherein:
the photographing assembly includes a photosensitive element and an adjustment device configured to adjust a position of the photosensitive element, and the adjustment device includes:
a plurality of support plates, each including a frame body, an adjustment part in the frame body, and an elastic part for connecting the frame body with the adjustment part, wherein the adjustment part supports the photosensitive element, a spacing is between the adjustment part and the frame body, and the adjustment part is able to move relative to the frame body; and
a plurality of displacement adjusters, wherein a displacement adjuster is abutted against the adjustment part and configured to overcome an elastic force of the elastic part, adjust a relative position between the adjustment part and the frame body, and adjust the position of the photosensitive element;
the adjustment part includes a first adjustment part in the frame body and a second adjustment part in the first adjustment part;
the elastic part includes a first elastic part, configured to connect the frame body with the first adjustment part, and a second elastic part, configured to connect the first adjustment part with the second adjustment part; and
the plurality of displacement adjusters includes a first displacement adjuster, which is between the frame body and the first adjustment part, and a second displacement adjuster, which is between the first adjustment part and the second adjustment part.

11. The photographing device according to claim 10, wherein:
the first displacement adjuster and the second displacement adjuster are located on two adjacent sides of the first adjustment part.

12. The photographing device according to claim 10, wherein:
a spacing is between the first adjustment part and the frame body, and a spacing is between the second adjustment part and the first adjustment part.

13. The photographing device according to claim 1, wherein:
the elastic part is on a side of the adjustment part abutted against the displacement adjuster and an opposite side thereof.

14. The photographing device according to claim 1, wherein:
the elastic part extends around a side of the adjustment part, having an extending direction along the side, and a spacing is between the elastic part and each of the adjustment part and the frame body.

15. The photographing device according to claim 14, wherein:
the elastic part includes an extension section extending along the side of the adjustment part and a folded section folded back from the extension section, and a spacing is between the folded section and the extension section.

16. The photographing device according to claim 1, wherein:
the displacement adjuster includes a piezoelectric actuator.

17. A photographing device comprising:
an underframe;
a cover plate; and
a photographing assembly, installed between the underframe and the cover plate, wherein:
the photographing assembly includes a photosensitive element and an adjustment device configured to adjust a position of the photosensitive element, and the adjustment device includes:
a plurality of support plates, each including a frame body, an adjustment part in the frame body, and an elastic part for connecting the frame body with the adjustment part, wherein the adjustment part supports the photosensitive element, a spacing is between the adjustment part and the frame body, and the adjustment part is able to move relative to the frame body; and
a plurality of displacement adjusters, wherein a displacement adjuster is abutted against the adjustment part and configured to overcome an elastic force of the elastic part, adjust a relative position between the adjustment part and the frame body, and adjust the position of the photosensitive element;
the adjustment device includes an installation assembly configured to install the displacement adjuster on a corresponding support plate; and
the installation assembly is abutted against the displacement adjuster, such that the displacement adjuster is abutted against the adjustment part to adjust a pre-tightening force of the elastic part.

18. The photographing device according to claim 17, wherein:
the installation assembly includes a stop bolt and a fitting element which abuts against the stop bolt and one end of the displacement adjuster; and
an installation through hole, connecting an outer side with an inner side of the frame body, is formed in the frame body, and the installation assembly is inserted into the installation through hole.

19. The photographing device according to claim 18, wherein:
the first installation through hole includes an inner section and an outer section connecting with the inner section;
the outer side of the frame body is recessed inwardly to form the outer section;
the inner section is connected to the outer section and the inner side of the frame body;
the stop bolt is movably installed on the outer section; and
the fitting element is movably inserted in the inner section.

* * * * *